US009023302B2

(12) United States Patent
Keiser et al.

(10) Patent No.: US 9,023,302 B2
(45) Date of Patent: May 5, 2015

(54) METHOD OF OXIDIZING MERCURY IN FLUE GAS

(71) Applicant: Ecolab USA Inc., Naperville, IL (US)

(72) Inventors: Bruce A. Keiser, Plainfield, IL (US);
Richard Mimna, Oakdale, PA (US);
Nicholas S. Ergang, Glen Ellyn, IL (US); Robert W. Dorner, Hanover (DE);
Jianwei Yuan, Aurora, IL (US);
Hung-Ting Chen, Naperville, IL (US)

(73) Assignee: Ecolab USA Inc., Naperville, IL (US)

( * ) Notice: Subject to any disclaimer, the term of this patent is extended or adjusted under 35 U.S.C. 154(b) by 0 days.

(21) Appl. No.: 14/202,745

(22) Filed: Mar. 10, 2014

(65) Prior Publication Data

US 2014/0271418 A1    Sep. 18, 2014

Related U.S. Application Data

(60) Provisional application No. 61/798,573, filed on Mar. 15, 2013.

(51) Int. Cl.
*B01D 53/64* (2006.01)
(52) U.S. Cl.
CPC ...................... *B01D 53/64* (2013.01)
(58) Field of Classification Search
CPC ...................................................... B01D 53/64
USPC ........................................... 423/210; 95/134
See application file for complete search history.

(56) References Cited

U.S. PATENT DOCUMENTS

| 6,214,304 | B1* | 4/2001 | Rosenthal et al. ............ 423/210 |
| 7,727,307 | B2 | 6/2010 | Winkler |
| 2001/0043889 | A1 | 11/2001 | Downs et al. |
| 2002/0068030 | A1 | 6/2002 | Nolan et al. |
| 2003/0091490 | A1* | 5/2003 | Nolan et al. .................. 423/210 |
| 2004/0074391 | A1 | 4/2004 | Durante et al. |
| 2007/0092418 | A1 | 4/2007 | Mauldin et al. |
| 2007/0122327 | A1* | 5/2007 | Yang et al. .................... 423/210 |
| 2009/0320680 | A1 | 12/2009 | Yang et al. |
| 2011/0014104 | A1* | 1/2011 | Ghorishi et al. ........... 423/242.1 |
| 2012/0115717 | A1* | 5/2012 | Gadkaree et al. ............. 502/401 |
| 2013/0053234 | A1* | 2/2013 | Fish et al. ....................... 502/10 |

OTHER PUBLICATIONS

International Search Report and the Written Opinion from corresponding PCT Appln. No. PCT/US2014/022612 dated Jul. 3, 2014 (13 pgs).

* cited by examiner

*Primary Examiner* — Timothy Vanoy
(74) *Attorney, Agent, or Firm* — Brinks Gilson & Lione (57) ABSTRACT

Methods for facilitating the removal of mercury from flue gases by converting elemental mercury to oxidized mercury and subsequently capturing the oxidized mercury. In one aspect, a method of removing mercury from a mercury-containing flue gas may include the steps of introducing into the flue gas a sulfide source in an effective amount to convert elemental mercury to gaseous oxidized mercury and then capturing the gaseous oxidized mercury.

17 Claims, 4 Drawing Sheets

METHOD OF OXIDIZING MERCURY IN FLUE GAS

CROSS-REFERENCE TO RELATED APPLICATIONS

This application claims priority from U.S. Provisional Application No. 61/798,573, filed Mar. 15, 2013, the entire contents of which are hereby incorporated by reference.

FIELD OF THE INVENTION

The present disclosure relates to methods for reducing emission of mercury into the environment from the burning of coal and/or other carbon-based fuels. Specifically, the disclosure relates to methods for converting elemental mercury to oxidized mercury and capturing said oxidized mercury.

BACKGROUND OF THE INVENTION

Mercury is naturally found in coal in concentrations ranging from 20 to 1000 ppb, and coal-fired power plants account for about 30% of global anthropogenic mercury emissions. All forms of mercury present in the coal decompose during combustion into the highly volatile elemental form ($Hg^0$), which can readily evade capture by existing air quality control devices typically found at power plants. However, if the mercury can subsequently be oxidized to an ionic form ($Hg^{2+}$), the mercury is much more readily captured by fly ash and sorbents and/or scrubber liquors. As a result, it is advantageous to maximize the conversion of elemental mercury to the oxidized form to enhance capture.

The dominant technology in use today to effect conversion of elemental mercury to oxidized mercury is the use of bromine-containing additives such as calcium bromide ($CaBr_2$), which has been shown to oxidize mercury much faster than the native chlorine present in many coals. However, the use of bromine additives results in formation of hydrobromic acid (HBr), which will either be emitted from the stack or become dissolved in scrubber liquors and waste waters, which is of concern for coal burning utilities that use wetlands to treat waste water. Further, the issue of whether the use of bromine additives will accelerate high-temperature corrosion mechanisms remains an open question.

Thus, there is a continuing need for methods of reducing the release of mercury into the environment, as well as preventing pollutant release resulting from mercury sequestration processes. More particularly, there is a need for techniques and products to oxidize gaseous elemental mercury without concomitant formation of harmful byproducts.

SUMMARY OF THE INVENTION

In one aspect, disclosed is a method of removing mercury from a mercury-containing flue gas. The method includes a) introducing into the flue gas a sulfide source in an effective amount to convert gaseous elemental mercury to gaseous oxidized mercury; and b) capturing the gaseous oxidized mercury.

In certain embodiments, the sulfide source may be a compound selected from the group consisting of sodium sulfide, copper sulfide and hydrogen sulfide. In certain embodiments, the sulfide source may be a polysulfide compound, optionally selected from the group consisting of sodium polysulfide, ammonium polysulfide, potassium polysulfide and calcium polysulfide. In certain embodiments, the sulfide source may be copper sulfide.

In certain embodiments, the gaseous oxidized mercury is captured using a wet air scrubber. In other embodiments, the gaseous oxidized mercury is captured using a sorbent.

In certain embodiments, the sulfide source is introduced in a combustion process comprising the flue gas. The combustion process may include an air-preheater, a boiler, and at least one device for capturing gaseous oxidized mercury. In certain embodiments, the sulfide source may be introduced downstream of the boiler.

In certain embodiments, the sulfide source may be introduced into the flue gas having a temperature of greater than about 150° C., greater than about 300° C., or greater than about 1,000° C.

In certain embodiments, the method may be used in a coal-fired power plant.

In another aspect, disclosed is a method of removing mercury from a mercury-containing flue gas passed through a wet flue gas desulfurizer. The method includes a) contacting the mercury-containing flue gas with a scrubber liquor of a wet flue gas desulfurizer, wherein the scrubber liquor comprises a sulfide source in an effective amount to convert elemental mercury to oxidized mercury; and b) capturing the oxidized mercury.

In some aspects, the sulfide may be selected from inorganic sulfides, such as sodium hydrosulfide, or organic sulfides, such as polythiocarbamates, in addition to organic sulfides containing other functional groups, such as mercapto acetic acid and 2,3-dimercaptopropanol.

In certain embodiments, the sulfide source is a compound selected from the group consisting of sodium sulfide, copper sulfide, and hydrogen sulfide. In certain embodiments, the sulfide source is a polysulfide compound. In certain embodiments, the polysulfide compound is selected from the group consisting of sodium polysulfide, ammonium polysulfide, potassium polysulfide, and calcium polysulfide. In certain embodiments, the sulfide source is copper sulfide or a copper sulfide/copper combination.

In certain embodiments, the scrubber liquor further comprises a mercury re-emission additive. The mercury re-emission additive may be a polydithiocarbamic compound or selected from the group consisting of inorganic sulfides, such as sodium hydrosulfide, or organic sulfides, such as polythiocarbamate or thiocarbamates, and organic sulfides with multifunctional groups, such as 2,3-dimercaptopropanol and mercapto acetic acid.

In certain embodiments, the sulfide source includes copper sulfide, and the mercury re-emission additive is a polydithiocarbamic compound.

DETAILED DESCRIPTION

Described herein are methods for converting elemental mercury to oxidized mercury.

In certain embodiments, a method of the invention involves the injection of a sulfide source into a mercury containing flue gas stream to form mercury sulfide, and capturing gaseous oxidized mercuric species (e.g., $HgCl_2$) arising from decomposition of the mercury sulfide.

Although the use of polysulfide compounds such as sodium polysulfide for the capture of mercury as solid mercuric sulfide (HgS) has been previously reported, the present inventors surprisingly and unexpectedly discovered that mercury sulfide in flue gas decomposes into a gaseous species that can be seen on a mercury monitor. While previous researchers have noted that polysulfide capture strategies are negatively affected by increases in flue gas temperatures and hydrochloric acid (HCl) concentrations, these researchers appear to ascribe the negative impact to HCl interaction with $Na_2S_4$ rather than HgS, assuming the latter to be stable. Thus, while instability of mercury sulfide in coal-fired flue gas may preclude the use of materials like $Na_2S_4$ and CuS as mercury sorbents, the present disclosure provides a method of using sulfide sources in such a way as to encourage the decomposition of mercury sulfide to a gaseous oxidized mercuric species (e.g., $HgCl_2$, $HgBr_2$, or $HgF_2$), which may be captured and removed from a flue gas, for example, using a sorbent or a wet scrubber.

The methods of the invention provide advantages over current processes for mercury capture in that mercury sequestration can be streamlined to fewer capture procedures compared to current methods. By increasing the fraction of oxidized mercury in the flue gas, the present method increases the amount of mercury removal by activated carbon injection, wet scrubbers, and/or other mercury control technologies already in place in the system. This improvement provides process efficiency and economic advantages over current methods, and reduces the burden on elemental mercury removal methods already in place in the system.

In certain embodiments, a method of the invention involves contacting a mercury containing flue gas stream with a sulfide source contained within a scrubber liquor, and capturing the resulting oxidized mercury in the scrubber liquor. The present inventors have surprisingly and unexpectedly discovered that scrubber liquors containing sulfide sources can effectively convert elemental mercury to oxidized mercury for subsequent capture in the liquor.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used in the specification and the appended claims, the singular forms "a," "and" and "the" include plural references unless the context clearly dictates otherwise. The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

The term "mercury re-emission," as used herein, refers to the phenomenon when water-soluble oxidized mercury ($Hg^{2+}$) undergoes chemical reduction to water-insoluble elemental mercury ($Hg^0$) in a wet flue gas desulfurization (WFGD) scrubber. It is believed the reduction occurs because of a reaction between mercury ions and sulfite ions present in the WFGD liquor. Because elemental mercury is insoluble in water, it exits the scrubber in the gas-phase. Thus the elemental mercury concentration in the flue gas exiting the scrubber is higher than the elemental mercury concentration entering the scrubber.

The term "percent mercury re-emission," as used herein, refers to:

$$\% \text{ Hg Re-emission} = \left( \frac{Hg^0_{outlet} - Hg^0_{inlet}}{Hg^T_{inlet} - Hg^0_{inlet}} \right) \times 100 \qquad \text{Equation 1}$$

where "outlet" refers to the stack gas mercury measurement, "inlet" refers to gas concentrations at the inlet to the WFGD, "0" refers to elemental mercury concentration in the gas, and "T" refers to the total concentration of mercury in the gas. The "outlet" measurement may refer to mercury gas measurements made at any location after the gas has exited the WFGD.

The term "percent mercury oxidation," as used herein, refers to:

$$\% \text{ Hg Oxidation} = \left( \frac{Hg^T_{inlet} - Hg^0_{inlet}}{Hg^T_{inlet}} \right) \times 100 \qquad \text{Equation 2}$$

where the super- and sub-scripts have the same meaning as defined in Equation 1 above.

The term "percent mercury capture," as used herein, refers to:

$$\% \text{ Hg Capture} = \left( \frac{Hg^T_{inlet} - Hg^T_{outlet}}{Hg^T_{inlet}} \right) \times 100 \qquad \text{Equation 3}$$

where the super- and sub-scripts have the same meaning as defined in Equation 1 above.

2. Methods of Converting Elemental Mercury to Gaseous Oxidized Mercury

Disclosed herein are methods of converting elemental mercury to oxidized mercury to facilitate mercury removal from combustion gases. The methods include contacting elemental mercury with a sulfide-source to produce oxidized mercury, which can subsequently be captured.

Methods of the present invention can be used in any process in which it is desirable to remove mercury from a flue gas. For example, the methods of the present invention can be used in waste incineration plants (e.g., domestic waste, hazardous waste, or sewage sludge incineration plants), power stations (e.g., bituminous coal-fired, or lignite-fired power stations), other plants for high-temperature processes (e.g., cement burning), and high-temperature plants co-fired with waste or combined (multistage) high-temperature plants (e.g., power stations or cement rotary kilns having an upstream waste pyrolysis or waste gasification).

Methods of the present invention can be used in processes of any dimension. The methods can be used in processes having a flue gas volumetric flow rate of $15\times10^3$ m$^3$ S.T.P. db/h, for example for sewage sludge incineration, or of $50\times10^3$ m$^3$ S.T.P. db/h, for example in hazardous waste incineration plants, or of $150\times10^3$ m$^3$ S.T.P. db/h, for example in domestic waste incineration, and also in large power stations having, for example, $2\text{-}3\times10^6$ m$^3$ S.T.P. db/h.

Sulfide sources useful with methods of the invention include, but are not limited to, copper sulfide (CuS), copper sulfide/copper combinations, sodium sulfide (Na$_2$S), a hydrate of sodium sulfide (e.g., Na$_2$S.9H$_2$O), a sodium polysulfide (e.g., sodium tetrasulfide), a calcium polysulfide, a potassium polysulfide, ammonium polysulfide, sodium hydrosulfide, hydrogen sulfide, carbon disulfide, polythiocarbamates, a polydithiocarbamic compound, 2,3-dimercaptopropanol, mercapto acetic acid, or any combination thereof. In certain embodiments, the sulfide source may be a blend comprising a copper sulfide and a polysulfide. In certain embodiments, the sulfide source may be a sorbent comprising copper and/or copper sulfide, a polysulfide, and a silica.

a. Introduction of Sulfide Source into Flue Gas

In one aspect, disclosed herein are methods of converting elemental mercury in a flue gas to gaseous oxidized mercury. The inventors have unexpectedly and surprisingly discovered that sulfide sources can be used to convert elemental mercury to gaseous oxidized mercury via a mercury sulfide decomposition process. Introduction of a sulfide source into a mercury containing flue gas produces mercury sulfide, which subsequently decomposes to a gaseous oxidized mercury (e.g., HgCl$_2$, HgBr$_2$, or HgF$_2$) that can be removed from the flue gas prior to exiting the stack.

In certain embodiments, a method of the invention includes (a) providing a sulfide source into a coal combustion flue gas such that reaction between the sulfide source with elemental mercury present in the gas forms mercury sulfide; and (b) capturing gaseous oxidized mercury formed from decomposition of the mercury sulfide. The sulfide source may be any sulfide source as described above. In certain embodiments, the sulfide source is copper sulfide or a copper sulfide/copper combination.

The sulfide source may be provided into the flue gas at any suitable location in a combustion process comprising the flue gas. In general, higher flue gas temperatures and longer residence times encourage the decomposition of the mercury sulfide produced by the reaction of the sulfide source with elemental mercury. The temperature of the flue gas during introduction of the sulfide source may be greater than 150° C., 200° C., 250° C., 300° C., 350° C., 400° C., 500° C., 550° C., 600° C., 650° C., 700° C., 750° C., 800° C., 850° C., 900° C., or 950° C. In certain embodiments, the flue gas ranges from about 150° C. to about 1000° C., from about 200° C. to about 1000° C., from about 250° C. to about 1000° C., from about 300° C. to about 1000° C., from about 350° C. to about 1000° C., from about 400° C. to about 1000° C., from about 450° C. to about 1000° C., from about 500° C. to about 1000° C., from about 550° C. to about 1000° C., from about 600° C. to about 1000° C., from about 650° C. to about 1000° C., from about 700° C. to about 1000° C., from about 750° C. to about 1000° C., from about 800° C. to about 1000° C., from about 850° C. to about 1000° C., from about 900° C. to about 1000° C., or from about 950° C. to about 1000° C.

The sulfide source may be provided into the flue gas by any suitable method known in the art. In certain embodiments, the sulfide source may be injected as an aqueous solution by nozzles directed into the combustion system. The aqueous solution can be co-injected with air, recycled flue gas, nitrogen, or another carrier gas to increase penetration of the sulfide source across the flue gas path and to improve mixing of the sulfide source and flue gas. For example, the sulfide source may be provided into the flue gas with a carrier gas, such as nitrogen or air; with hot steam; with a slurry blended with other additives (e.g., sulfur oxide sorbents); via a fixed bed apparatus through which the flue gas is made to pass; in combination with an inorganic sorbent such as an aluminosilicate, silica containing material, or zeolite; in combination with activated carbon; via a lance; via a conveyor belt; or as an aqueous solution.

The gaseous oxidized mercury produced by decomposition of the produced mercury sulfide can be captured by devices and processes known in the art. In certain embodiments, the gaseous oxidized mercury is captured using one or more scrubbers currently used in the industry (e.g., spray towers, jet bubblers, and co-current packed towers). In certain embodiments, the gaseous oxidized mercury is captured using one or more sorbents. In certain embodiments, the gaseous oxidized mercury is captured using one or more scrubbers in combination with one or more sorbents.

Figure 1:
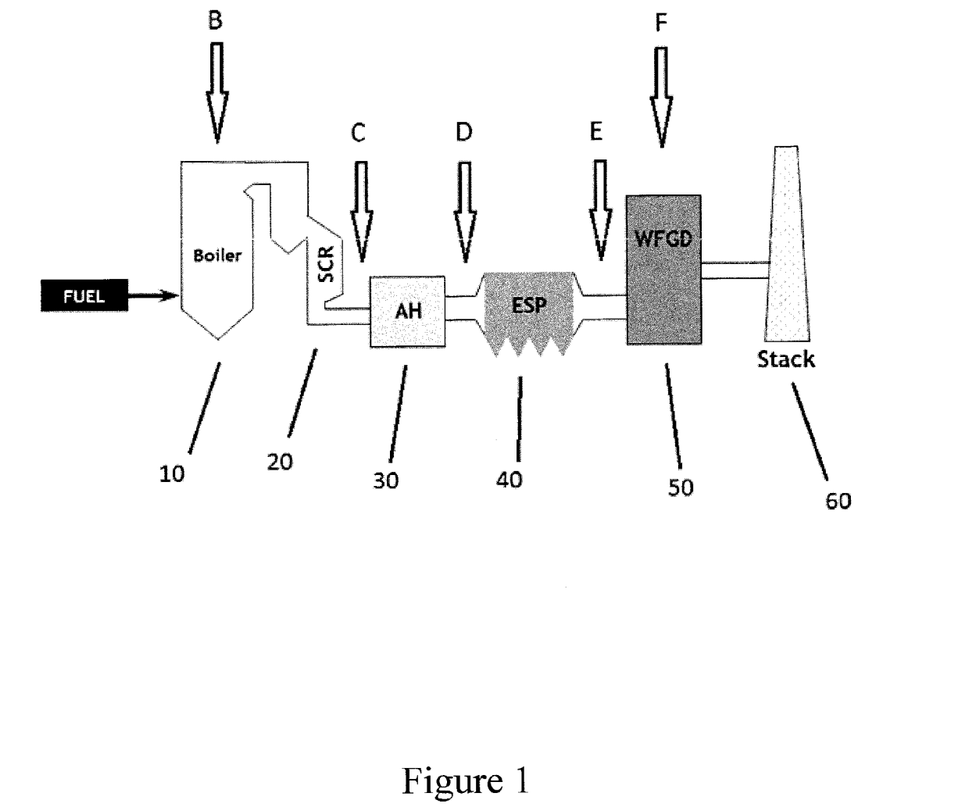
FIG. 1 is a diagram of a coal-fired power plant.

FIG. 1 depicts an exemplary coal-fired power plant amenable to methods of the present invention. The power plant includes a boiler 10, a selective catalytic reduction device 20, an air preheater 30, a particulate control device 40 (e.g., an electrostatic precipitator), a scrubber 50 (e.g., a wet or dry flue gas desulpherization system), and a discharge stack 60. The coal-fired power plant may have additional components, as well as multiple devices of the same or similar type (e.g., multiple particulate control devices).

The sulfide source can be injected into the system of FIG. 1 at any suitable location. In certain embodiments, the sulfide source may be injected into the boiler 10, such as at point B. In certain embodiments, the sulfide source may be injected upstream of the air preheater 30, such as at point C. In certain embodiments, the sulfide source may be injected downstream of the air pre-heater 30, such as at point D. It is to be understood that alternative setups are possible such that any of the system components (e.g., SCR, air preheater, particulate control device) may be configured upstream or downstream relative to one another as appropriate, and that the point of sulfide introduction can be adjusted to account for such alternative configurations.

b. Introduction of Sulfide Source into Scrubber Liquor

In another aspect, disclosed herein are methods of converting elemental mercury to oxidized mercury in a wet scrubber. The inventors have unexpectedly and surprisingly discovered that sulfide sources can be used to convert elemental mercury to oxidized mercury by contacting elemental mercury passing through a wet scrubber with the sulfide source, the sulfide source contained within the scrubber liquor. The oxidized mercury can be captured in the scrubber liquor and removed from the flue gas prior to exiting the stack.

In certain embodiments, a method of the invention includes (a) contacting mercury-containing flue gas with a scrubber liquor of a wet flue gas desulfurizer, wherein the scrubber liquor comprises a sulfide source in an effective amount to convert elemental mercury to oxidized mercury; and (b) capturing the oxidized mercury. The sulfide source may be any sulfide source as described above. In certain embodiments, the sulfide source is copper sulfide, a copper sulfide/copper combination, or a polysulfide.

The methods can be used with any scrubbers currently used in the industry, including spray towers, jet bubblers, and co-current packed towers. These types of particulate control devices are provided as examples and are not meant to represent or suggest any limitation.

In certain embodiments, a configuration according to FIG. 1 may be adapted to the method. The sulfide source and any additional constituents co-introduced or blended with the sulfide source may be introduced at points E and/or F, for example.

The sulfide source may be introduced into a scrubber and thereby into the scrubber liquor via several routes. For example, sulfide source may be added to a virgin limestone or lime slurry prior to addition to a scrubber, to the recirculation loop of a scrubber liquor, or to a "low solids" return to a scrubber from the scrubber purge stream. The addition of a sulfide source, such as copper sulfide, can be made in any suitable location in a scrubber process, wholly or fractionally (i.e. a single feed point or multiple feed points), including but not limited to the make-up water for the lime or limestone slurry or the scrubber liquor.

In certain embodiments, the sulfide source may be added to a wet scrubber via a "low solids" liquor return. A portion of the liquor is usually continuously removed from the scrubber for the purpose of separating reaction byproducts from unused lime or limestone. One means of separation that is currently used is centrifugation. In this process the scrubber liquor is separated into a "high solids" and "low solids" stream. The high solids stream is diverted to wastewater processing. The low solids fraction returns to the wet scrubber and can be considered "reclaimed" dilute liquor. The sulfide source can conveniently be added to the reclaimed low solids stream prior to returning to the scrubber.

In certain embodiments, the sulfide source may be added to the wet scrubber via a "virgin liquor." Virgin liquor is the water-based dispersion of either lime or limestone prior to exposure to flue gas and is used to add fresh lime or limestone while maintaining the scrubber liquor level and efficiency of the wet FGD. This is prepared by dispersing the lime or limestone in water. Here the sulfide source can be added either to the dispersion water or the virgin liquor directly. In certain embodiments, the sulfide source may be added to scrubber liquor injected directly into the flue gas prior to the scrubber for the purpose of controlling relative humidity of the flue gas or its temperature (e.g., at point E in FIG. 1).

The scrubber liquors referred to herein may be water-based dispersions of calcium carbonate (limestone) or calcium oxide (lime) used in a wet flue gas desulfurizer to capture SOx emissions. The liquor may also contain other additives such as magnesium and low-molecular weight organic acids, which function to improve the sulfur capture. One example of such an additive is a mixture of low-molecular weight organic acids known as dibasic acid (DBA). DBA consists of a blend of adipic, succinic, and glutaric acids. Each of these organic acids can also be used individually. In addition, another low-molecular weight organic acid that can be used to improve sulfur capture in a wet scrubber is formic acid. Finally, the scrubber liquor may also contain byproducts of the interaction between the lime or limestone and sulfur species, which leads to the presence of various amounts of calcium sulfite or calcium sulfate. The scrubber liquor may include the make-up liquor, return liquor, the reclaimed liquor, virgin liquor, and/or liquor injected directly into flue gasses.

In certain embodiments, the scrubber liquor may further comprise a mercury re-emission control additive. The mercury re-emission control additive may be introduced into the scrubber liquor separately from the sulfide source and/or may be blended with the sulfide source and/or may be provided to the scrubber liquor simultaneously (e.g., co-fed) with the sulfide source.

Mercury re-emission control additives that can be used with the methods of the invention include any additive suitable to reduce and/or prevent mercury re-emission from combustion processes, and in particular, scrubber liquors. In certain embodiments, the mercury re-emission control additive may be a poly-dithiocarbamic compound (e.g., MerControl 8034, also referred to herein as "poly-DTC"), or another sulfur-containing additive such as sodium sulfide, sodium hydrosulfide, sodium bisulfide, or a poly-sulfide. In certain embodiments, the mercury re-emission control additive may be diethyldithiocarbamate or a sodium salt thereof. In certain embodiments, the mercury re-emission control additive may be dimethyldithiocarbamate or a sodium salt thereof. In certain embodiments, the mercury re-emission control additive may be an inorganic poly-sulfide or blend, such as PRAVO, a product from Vosteen. In certain embodiments, the mercury re-emission additive may be a sodium or calcium salt of 1,3,5-triazine-2,4,6(1H,3H,5H)-trithione (also referred to as trimercapto-S-triazine), such as TMT-15, a product from Degussa. In certain embodiments, the mercury re-emission control additive may be an activated carbon, such as disclosed in U.S. Pat. No. 7,727,307 B2. In certain embodiments, the mercury re-emission control additive may be a dithiol, a dithiolane, or a thiol having a single thiol group and either an oxygen or a hydroxyl group. Suitable dithiols include, but are not limited to, 2,3-dimercaptopropanol, dimercaptosuccinic acid, and 1,8-octanedithiol. Suitable dithiolanes include, but are not limited to, 1,2-dithiolane-3-valeric acid and 2-methyl 1,3-dithiolane. Suitable thiols include, but are not limited to, mercaptoacetic acid and sodium salts thereof. In certain embodiments, a combination of mercury re-emission control additives may be used. In one preferred embodiment, the mercury re-emission control additive comprises a poly-dithiocarbamic compound.

In certain embodiments, the mercury re-emission control additive may be a water-soluble ethylene dichloride ammonia polymer having a molecular weight of from 500 to 10,000, and containing from 5 to 55 mole % of dithiocarbamate salt groups to prevent re-emission of mercury across a wFGD. The polymer may be prepared by the reaction of ethylene dichloride and ammonia to provide a polyamine or polyimine. The polyamine or polyimine may have a molecular weight range of 500-100,000. In a preferred embodiment, the molecular weight may be 1,500 to 10,000, with the most preferred molecular weight range being 1,500 to 5,000. The dithiocarbamate groups of the polymers may be introduced by the reaction of the polyamines or polyimines with carbon disulfide to produce polydithiocarbamic acid or their salts. Such reaction is preferably carried out in a solvent such as water or alcohol at a temperature of from 30° C. and 100° C. for periods of time ranging between 1 and 10 hours. Good conversion may be obtained at temperatures between 40° and 70° C. for 2 to 5 hours. The mole % of dithiocarbamate salt groups in the finished polymer may be within the range of 5 to 55%, 20 to 40 mole %, or 25 to 30 mole %. The salts include, but are not limited to, alkaline and alkali earth such as sodium, lithium, potassium or calcium. The finished polymer may be applied to a combustion process at a ratio of 1:1 to 2000:1 weight copolymer to weight of mercury being captured. One preferred ratio may be from 5:1 to 1000:1 more preferably from 5:1 to 500:1.

In certain embodiments, the mercury re-emission control additive may be a composition comprising a polymer derived from at least two monomers: acrylic-x and an alkylamine, wherein said acrylic-x has the following formula:

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals. The metals can include zero valent, monovalent, and multivalent metals. The metals may or may not be ligated by organic or inorganic compounds. Also, the metals can be radioactive and nonradioactive. Examples include, but are not limited to, transition metals and heavy metals. Specific metals can include, but are not limited to: copper, nickel, zinc, lead, mercury, cadmium, silver, iron, manganese, palladium, platinum, strontium, selenium, arsenic, cobalt and gold.

The molecular weight of the acrylic-x and an alkylamine derived polymers can vary. For example, the target species/application for the polymers can be one consideration. Another factor can be monomer selection. Molecular weight can be calculated by various means known to those of ordinary skill in the art. For example, size exclusion chromatography, as discussed in the examples below can be utilized. When molecular weight is mentioned, it is referring to the molecular weight for the unmodified polymer, otherwise referred to as the polymer backbone. The functional groups that are added to the backbone are not part of the calculation. Thus the molecular weight of the polymer with the functional groups can far exceed the molecular weight range. In one embodiment, the molecular weight of the polymer is from 1,000 to 16,000. In another embodiment, the molecular weight of said polymer is from 1,500 to 8,000.

Various functional groups can be utilized for metal scavenging. The following phraseology would be well understood by one of ordinary skill in the art: wherein said polymer is modified to contain a functional group capable of scavenging one or more compositions containing one or more metals. More specifically, the polymer is modified to contain a functional group that can bind metals. In one embodiment, the functional group contains a sulfide containing chemistry. In another embodiment, the functional group is a dithiocarbamate salt group. In another embodiment, the functional groups are at least one of the following: alkylene phosphate groups, alkylene carboxylic acids and salts thereof, oxime groups, amidooxime groups, dithiocarbamic acids and salts thereof, hydroxamic acids, or nitrogen oxides. The molar amounts of the functional group relative to the total amines contained in the unmodified polymer can vary as well. For example, the reaction of 3.0 molar equivalents of carbon disulfide to a 1.0:1.0 mole ratio acrylic acid/TEPA copolymer, which contains 4 molar equivalents of amines per repeat unit after polymerization, will result in a polymer that is modified to contain 75 mole % dithiocarbamate salt group. In other words, 75% of the total amines in the unmodified polymer have been converted to dithiocarbamate salt groups. In one embodiment, the polymer may have between 5 to 100 mole % of the dithiocarbamate salt group. In a further embodiment, the polymer has from 25 to 90 mole % of the dithiocarbamate salt group. In yet a further embodiment, the polymer has from 55 to 80 mole % of the dithiocarbamate salt group.

Monomer selection will depend on the desired acrylic-x and an alkylamine derived polymer. In one embodiment, the alkylamine is at least one of the following: an ethyleneamine, a polyethylenepolyamine, ethylenediamine (EDA), diethylenetriamine (DETA), triethylenetetraamine (TETA), tetraethylenepetamine (TEPA) and pentaethylenehexamine (PEHA). In another embodiment, the acrylic-x is at least one of the following: methyl acrylate, methyl methacrylate, ethyl acrylate, and ethyl methacrylate, propyl acrylate, and propyl methacrylate. In another embodiment, the acrylic-x is at least one of the following: acrylic acid and salts thereof, methacrylic acid and salts thereof, acrylamide, and methacrylamide. The molar ratio between monomers that make up the polymer, especially acrylic-x and alkylamine can vary and depend upon the resultant polymer product that is desired. The molar ratio used is defined as the moles of acrylic-x divided by the moles of alkylamine. In one embodiment, the molar ratio between acrylic-x and alkylamine is from 0.85 to 1.5. In another embodiment, the molar ratio between acrylic-x and alkylamine is from 1.0 to 1.2. Various combinations of acrylic-x and alkylamines are encompassed by this invention as well as associated molecular weight of the polymers. In one embodiment, the acrylic-x is an acrylic ester and the alkylamine is PEHA or TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic ester can be at least one of the following: methyl acrylate, methyl methacrylate, ethyl acrylate, and ethyl methacrylate, propyl acrylate, and propyl methacrylate, which is combined with at least one of the alklyamines, which includes PEHA or TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %. In another embodiment, the acrylic-x is an acrylic amide and the alkylamine is TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic amide can be at least one or a combination of acrylamide and methacrylamide, which is combined with at least one of the alklyamines, which includes PEHA or TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %. In another embodiment, the acrylic-x is an acrylic acid and salts thereof and the alkylamine is PEHA or TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic acid can be at least one or a combination of acrylic acid or salts thereof and methacrylic acid or salts thereof, which is combined with at least one of the alklyamines, which includes TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %.

Additional monomers can be integrated into the polymer backbone made up of constituent monomers acrylic-x and alkylamine. A condensation polymer reaction scheme can be utilized to make the basic polymer backbone chain. Various other synthesis methods can be utilized to functionalize the polymer with, for example, dithiocarbamate and/or other non-metal scavenging functional groups. One of ordinary skill in the art can functionalize the polymer without undue experimentation. In certain embodiments, the composition can be formulated with other polymers such as a water soluble ethylene dichloride ammonia polymer having a molecular weight of from 500 to 100,000 which contains from 5 to 55 mole % of dithiocarbamate salt groups. In one embodiment, the molecular weight of the polymer is from 1,500 to 10,000 and contains 15 to 50 mole % of dithiocarbamate salt groups. In a preferred embodiment, the molecular weight of the polymer is from 1,500 to 5,000 and contains 30 to 55 mole % of dithiocarbamate salt groups. In certain embodiments, the composition can be formulated with other small molecule sulfide precipitants such as sodium sulfide, sodium hydrosulfide, TMT-15® (sodium or calcium salts of trimercapto-S-triazine), dimethyldithiocarbamate, and/or diethyldithiocarbamate.

The dosage of the disclosed mercury re-emission control additives may vary as necessitated to reduce or prevent mercury re-emission. Process medium quality and extent of process medium treatment are a couple of factors that can be considered by one of ordinary skill in the art in selecting dosage amount. A jar test analysis is a typical example of what is utilized as a basis for determining the amount of dosage required to achieve effective metals removal in the context of a process water medium, e.g. wastewater. In one embodiment, the amount of mercury re-emission control additive for effectively removing metals from contaminated waters may be within the range of 0.2 to 2 moles of dithiocarbamate per mole of metal, or 1 to 2 moles of dithiocarbamate per mole of metal contained in the water. According to one embodiment, the dosage of metal removal polymer required to chelate and precipitate 100 ml of 18 ppm soluble copper to about 1 ppm or less was 0.011 gm (11.0 mg) of polymer. The metal polymer complexes formed are self-flocculating and quickly settle. These flocculants are easily separated from the treated water. In the context of applying the polymer to a gas system, such as a flue gas, the polymer can be dosed incrementally and capture rates for a particular metal, e.g. such as mercury, can be calculated by known techniques in the art. In certain embodiments, a mercury re-emission control additive, such as a water-soluble ethylene dichloride ammonia polymer with dithiocarbamate salt groups, may be applied to a scrubber liquor at a ratio of 1:1 to 2000:1 weight of polymer to weight of mercury being captured. One preferred dosage ratio is from 5:1 to 1000:1, more preferably from 5:1 to 500:1.

c. Introduction of Sulfide Source into Flue Gas and Scrubber Liquor

In another aspect, disclosed herein are methods of converting elemental mercury to oxidized mercury by contacting elemental mercury in a flue gas with a sulfide source, and by contacting elemental mercury passing through a wet scrubber with a sulfide source.

In certain embodiments, a method of the invention includes (a) introducing into a mercury-containing flue gas a sulfide source in an effective amount to convert elemental mercury to gaseous oxidized mercury; (b) contacting said mercury-containing flue gas with a scrubber liquor of a wet flue gas desulfurizer, wherein the scrubber liquor comprises a sulfide source in an effective amount to convert elemental mercury to oxidized mercury; and (c) capturing the oxidized mercury. The sulfide source may be any sulfide source as described above. The sulfide may be introduced into devices and processes as described above, and following the methods described above.

In certain embodiments, the scrubber liquor may further comprise a mercury re-emission control additive, as described herein. The mercury re-emission control additive may be introduced into the scrubber liquor separately from the sulfide source and/or may be blended with the sulfide source and/or may be provided to the scrubber liquor simultaneously (e.g., co-fed) with the sulfide source.

3. EXAMPLES

Example 1

Formation of Gaseous Oxidized Mercury from Mercuric Sulfide

The instability of mercury sulfide was demonstrated by twice dropping pure mercury sulfide powder into the flue gas duct ahead of an electrostatic precipitator (ESP) where it would be captured and exposed to hot flue gas.

Figure 2:
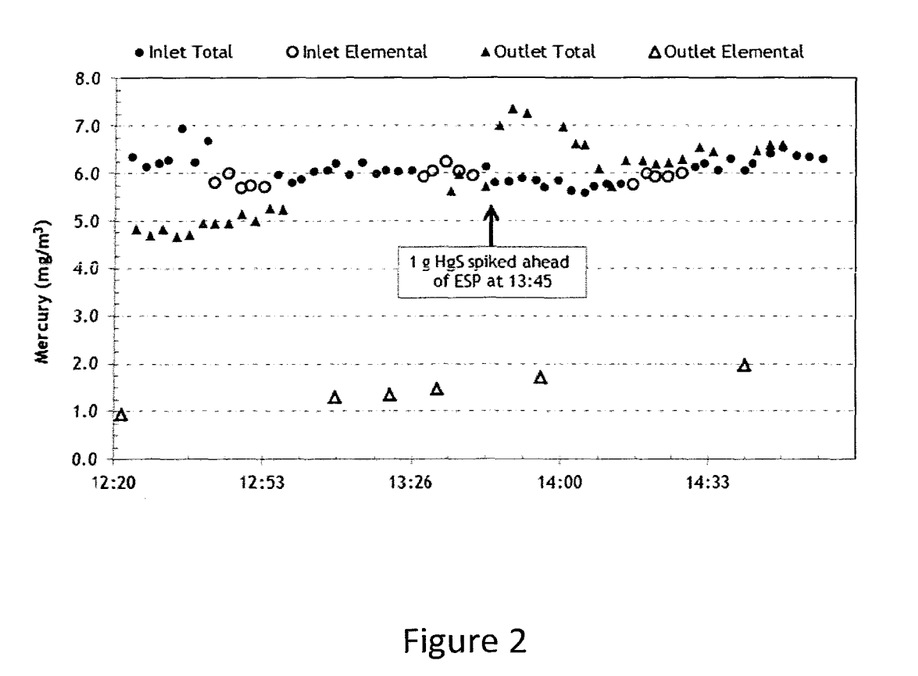
FIG. 2 is a plot of inlet and outlet mercury levels in a flue gas measured before and after a 1 gram spike of mercury sulfide powder.
Figure 3:
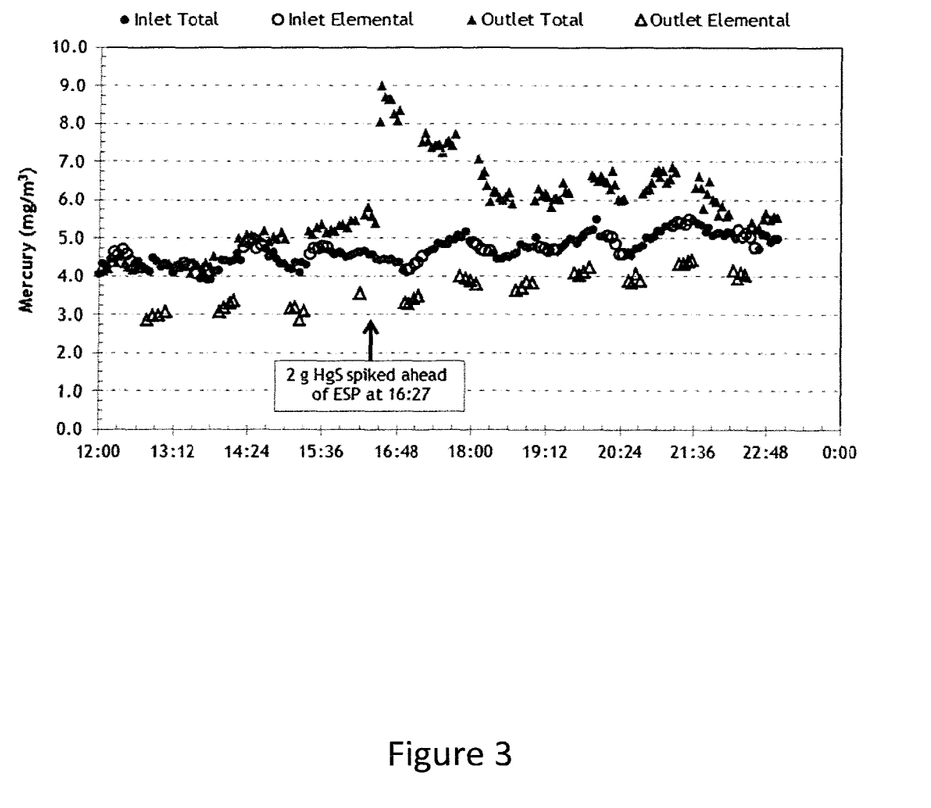
FIG. 3 is a plot of inlet and outlet mercury levels in a flue gas measured before and after a 2 gram spike of mercury sulfide powder.

As shown in FIGS. 2 and 3, each time outlet mercury levels rose sharply above inlet levels after dosing with pure mercury sulfide powder. There was no concomitant increase in elemental mercury levels seen during these experiments, indicating the gaseous form of mercury that had evolved was evidently in an oxidized form. Among the known possible mercury (II) compounds that could conceivably be formed, mercuric chloride ($HgCl_2$) and mercuric bromide ($HgBr_2$) would be sufficiently stable and volatile to be measured by the mercury monitors. Without being bound by theory, it is believed that since coals almost invariably contain far more chlorine relative to bromine, the end product is almost certainly the mercuric chloride, though either product is an acceptable ionic form for subsequent capture and removal of mercury from the flue gas.

Example 2

Injection of Sulfide Source Pre-APH

Figure 4:
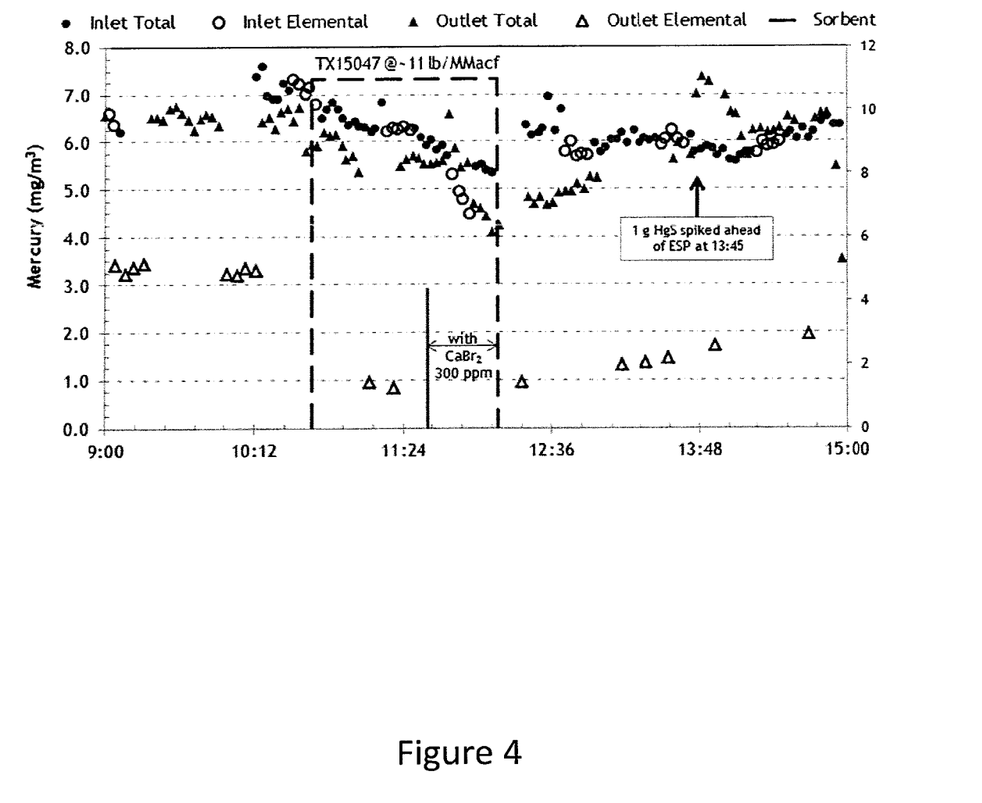
FIG. 4 is a plot of inlet and outlet mercury levels in a flue gas measured before and after use of a copper sulfide sorbent.

As shown in FIG. 4, copper sulfide was injected ahead of an pre air-preheater and resulted in an increase in the percentage of mercury that was oxidized (measured at the stack) from 48% to 85%. These results indicate that introduction of a sulfide source into the flue gas is an effective amount to convert elemental mercury to oxidized mercury, thereby facilitating removal of mercury from the flue gas through systems already in place (e.g., wFGDs). In FIG. 4, TX15047 refers to dry MerControl 6012. The basic formulation from CHARMS is about 68% colloidal silica; about 9.67% sulfur; about 7.21% copper compound; and about 15.13% water.

Example 3

Formation of Oxidized Mercury from Polysulfide Species

It was demonstrated in a bench top experiment, employing an Ohio Lumex spectrometer, that a polysulfide species is capable of oxidizing elemental mercury. An extra impinger was incorporated into the set-up involving the RP-915+ spectrometer to allow the gas to bubble through an extra solution. The use of $SnCl_2$ results in the ionic mercury present in the 500 ppt standard solution to be reduced to elemental mercury and released into the vapor phase travelling through the impinger train. In the 500 ppt Hg baseline experiment, the extra impinger contained 25.2 g DI water, i.e. no extra oxidation or capture is possible. To measure the ability of polysulfide to oxidize mercury, 3.25 g of a 28% solution of calcium polysulfide was added to the extra impinger and the 500 ppt Hg standard was re-run. All experiments were run in triplicate. As shown in Table 1, a 20% reduction in mercury reaching the detector was observed with the polysulfide. Thus, sulfide sources contained in scrubber liquors can facilitate mercury oxidation and capture. A mercury re-emission additive may be coupled with the use of the sulfide-species to further reduce mercury emission.

TABLE 1

| Impinger Solution | Outlet Detector ppt | St. dev. |
| --- | --- | --- |
| Blank | 499.67 | 7.04 |
| 28% solution of calcium polysulfide | 398.67 | 21.75 |

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The invention claimed is:

1. A method of removing mercury from a mercury-containing flue gas, comprising the steps of:
   a) introducing into the flue gas a sulfide source in an effective amount to convert elemental mercury to gaseous oxidized mercury; and
   b) capturing the gaseous oxidized mercury using a wet flue gas desulfurizer (wFGD).

2. The method of claim 1, wherein the sulfide source is a compound selected from the group consisting of sodium sulfide, copper sulfide, and hydrogen sulfide.

3. The method of claim 1, wherein the sulfide source is a polysulfide compound.

4. The method of claim 3, wherein the polysulfide compound is selected from the group consisting of sodium polysulfide, ammonium polysulfide, potassium polysulfide, and calcium polysulfide.

5. The method of claim 1, wherein the sulfide source is copper sulfide or a copper sulfide/copper combination.

6. The method of claim 1, wherein the sulfide source is introduced in a combustion process comprising the flue gas, wherein the combustion process comprises an air-preheater, a boiler, and at least one device for capturing gaseous oxidized mercury, and wherein the sulfide source is introduced downstream of the boiler.

7. The method of claim 1, wherein the sulfide source is introduced into the flue gas having a temperature of greater than 150° C.

8. The method of claim 1, wherein the sulfide source is introduced into the flue gas having a temperature of greater than 300° C.

9. The method of claim 1, wherein the method is used in a coal-fired power plant.

10. A method of removing mercury from a mercury-containing flue gas, the method comprising:
    a) contacting the mercury-containing flue gas with a scrubber liquor of a wet flue gas desulfurizer, wherein the scrubber liquor comprises a sulfide source in an effective amount to convert elemental mercury to oxidized mercury; and
    b) capturing the oxidized mercury, wherein the scrubber liquor further comprises a mercury re-emission additive.

11. The method of claim 10, wherein the sulfide source is a compound selected from the group consisting of sodium sulfide, copper sulfide, and hydrogen sulfide.

12. The method of claim 10, wherein the sulfide source is a polysulfide compound.

13. The method of claim 12, wherein the polysulfide compound is selected from the group consisting of sodium polysulfide, ammonium polysulfide, potassium polysulfide, and calcium polysulfide.

14. The method of claim 10, wherein the sulfide source is copper sulfide or a copper sulfide/copper combination.

15. The method of claim 10, wherein the mercury re-emission additive is a polydithiocarbamic compound.

16. The method of claim 10, wherein the sulfide source comprises copper sulfide, and the mercury re-emission additive is a polydithiocarbamic compound.

17. A method of removing mercury from a mercury-containing flue gas, comprising the steps of:
    a) introducing into the flue gas a sulfide source in an effective amount to convert elemental mercury to gaseous oxidized mercury; and
    b) capturing the gaseous oxidized mercury using a sorbent.

* * * * *